Jan. 13, 1970     W. S. CHEN ET AL     3,489,631
METHOD FOR BONDING POLYURETHANE TO PLASTIC MATERIAL
Filed March 4, 1965
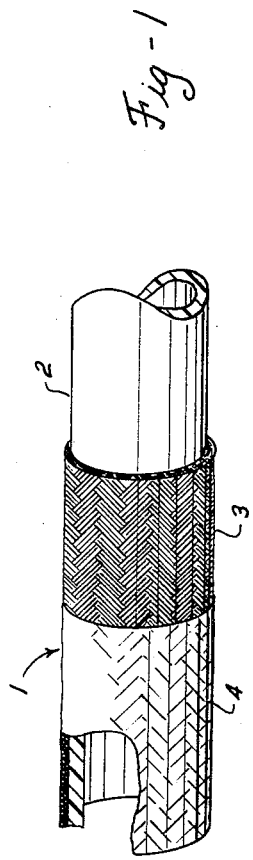
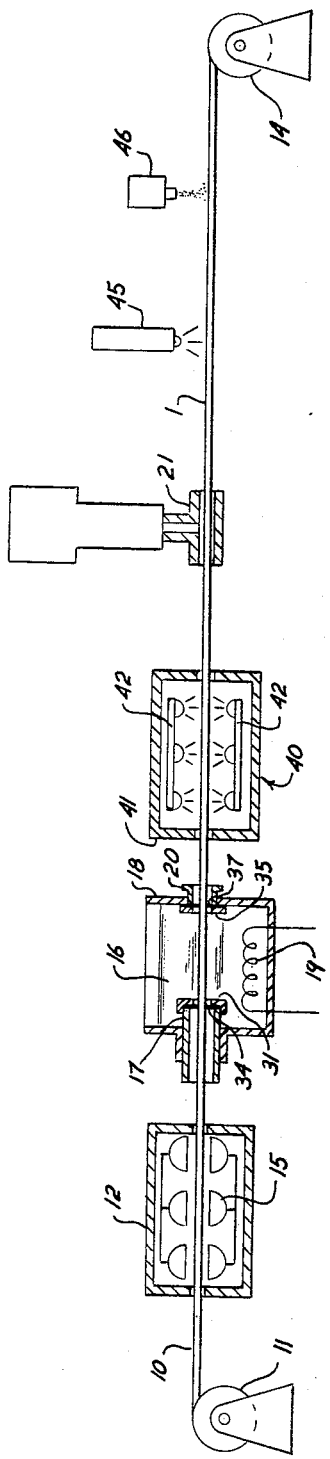
INVENTORS
WILSON S. CHEN
LAWRENCE P. BLACHMAN
BY WALTER J. FOCHT, JR.
ATTORNEYS United States Patent Office 3,489,631
Patented Jan. 13, 1970

3,489,631
METHOD FOR BONDING POLYURETHANE
TO PLASTIC MATERIAL
Wilson S. Chen and Lawrence P. Blachman, Reading, and Walter J. Focht, Jr., Centerport, Pa., assignors to The Polymer Corporation, a corporation of Pennsylvania
Filed Mar. 4, 1965, Ser. No. 437,083
Int. Cl. C09j 5/02; B32b 27/40, 31/12
U.S. Cl. 156—244                                          11 Claims

ABSTRACT OF THE DISCLOSURE

A method of bonding polyurethane to plastics, e.g., polyamides, and a hose comprised of a polyamide inner tubing, a braided jacket, and a polyurethane outer sheath are disclosed. The method involves the steps of applying a solvent for the polyamide, applying a solvent for the polyurethane and extruding on a polyurethane jacket or sheath.

---

This invention relates to a method for bonding polyurethane to plastic material especially the class of plastic known as nylons or polyamides, although certain aspects of the invention are applicable to the bonding of polyurethane to other materials. Thus the invention is concerned with the formation of composite structures of laminates, exploiting the desirable properties of both the polyurethane and the material to which it is bonded such as polyamide, in a possibly synergistic manner.

The new plastic hose structure discussed in detail herein forms a good illustration of such exploitation of some of the best characteristics of the materials. The hose includes a nylon inner tube with a braided nylon jacket. The nylon in both of these portions of the hose provides strength and inertness to material passing through the hose. The polyurethane cover provided for the hose contributes wear resistance and external smoothness, without unduly limiting the flexibility of the hose. These advantages flow largely from the flexibility and elastomeric properties of the polyurethane.

From the foregoing, it can be seen that while the invention is particularly useful in improving the construction of plastic hose, in its more general aspects it comprises a solution to the problem of obtaining a strong, secure bond between polyurethane and nylon.

In its more specific aspects, the invention relates to improved hoses of the kind having an inner core and an outer strength imparting covering of braided fibers, and to an improved method of constructing such hoses. It is particularly concerned with hoses of this type wherein the outer braided covering is formed of synthetic fibers, such as nylon, which are preferably bonded, at least in part, to the inner core, which itself is desirably formed of nylon.

Examples of braided-covered hoses are disclosed in U.S. Patent No. 2,977,839 to Koch. Such hoses have found wide application as high pressure lines for various gases and liquids, because of their high burst strength. The braided covering makes an important contribution to the burst strength of such hoses, and it is thus important to preserve the structural integrity of the braid. The principal threats to the integrity of the braid are external: it can be abraded, snagged or chafed.

Pressure hoses are useful in applications where cleanliness is required. The braided covering presents a problem in such environments because it has many interstices in which dirt can lodge, and it is correspondingly difficult to clean.

According to this invention an improved pressure hose having a braided cover is provided in which the braid is covered and protected by a thin, flexible, tough, securely bonded polyurethane coating. The polyurethane coating establishes a relatively smooth outer surface for the hose, thus improving its resistance to dirt and making it easier to clean.

The effectiveness of the polyurethane coating is impaired if it is not securely bonded to the braid substantially throughout the coating.

In accordance with the invention, a secure bond is achieved between polyurethane and nylon, whether it be in the form of a fiber braid or in another form, by taking special steps to insure that the bond between the two materials is, in large part, based on hydrogen association bonds at the interface. In order to bring this about, steps are taken prior to, and during the application of the polyurethane coating, to increase the mobility of the polyurethane with respect to the polyamide. Mobility is used here in two senses. The first is a kind of "macro-mobility." It means that the polyurethane is made readily flowable so that good surface contact between it and the polyamide is obtained. The second sense in which mobility is used is that of a "micro-mobility" which means that the individual molecules of the polyurethane are provided with sufficient freedom of movement with respect to each other so that those at the interface can orient themselves to form hydrogen bonds with the polyamide. Both types of mobility contribute to maximize the opportunity for the polyurethane to form hydrogen association bonds. In addition, steps are desirably taken to increase the mobility of the polyamide to encourage the formation of hydrogen association bonds.

It is an object of the invention to provide an improved method for securing a tight bond between polyurethane and polyamide.

Another object of this invention is the provision of improved composite structures of polyurethane and polyamide.

Another object of the invention is to provide an improved pressure hose which is highly abrasion resistant and which is easy to keep clean.

A further object of this invention is to provide an improved nylon pressure hose with a protective polyurethane covering.

Still another object of the invention is the provision of improvements in the art of constructing pressure hoses including the provision of steps insuring that the polyurethane protective cover which is a feature of the invention is tightly bonded to the pressure hose.

The above objects and purposes, together with other objects and purposes, can be best understood by considering the detailed description which follows together with the accompanying drawings in which:

FIGURE 1 is a somewhat diagrammatic illustration, partly broken away and partly in section, of a hose constructed in accordance with the invention; and FIGURE 2 is a schematic drawing of an apparatus for applying a polyurethane covering to hose in accordance with the invention.

In accordance with the invention, the increased mobility of the polyurethane is attained in part by the use of a solvent or swelling agent for the polyurethane. As will be explained in greater detail later, the preferred solvent is vinyl pyrrolidone. The solvent may be used alone at the interface between the polyamide and the polyurethane which is usually applied later, or it may have a quantity of polyurethane dissolved in it before it is applied to the interface.

The mobility of the polyurethane layer which is being applied to the nylon is also preferably increased by the use of heat. This can be done in several convenient ways depending upon the particular structure being made. For example, the polyurethane can be fed to the bonding surface in hot, pre-softened condition by means of a heated screw extruder.

The mobility of the nylon or polyamide is desirably increased at the time of coating by pre-heating it. It is also increased by treating the surface of the nylon with a material which may be termed a solvent swelling agent or softening agent.

As a softening agent for nylon, resorcinol has been found to yield particularly beneficial results. The reasons for this are not fully understood, and there is no intention to be limited here by a particular theory of the mechanism, but it is thought that the hydroxyl groups on each end of the resorcinol molecule contribute to the result. The hydroxyl group at one end of the resorcinol molecule may readily attach itself to the polyamide in a hydrogen association bond. The group at the other end may attach itself to the polyurethane or to the vinyl pyrrolidone solvent, the bonds again being hydrogen association bonds. The polyurethane and the polyamide may be bonded together by a chain having two links, one being rescorcinol and the other being vinyl pyrrolidone, and the bonds throughout being of the hydrogen association type.

Each of the steps outlined above for increasing the mobility of the materials to be bonded result in an increase in the probability of forming hydrogen association bonds. The probability is increased when more than one such step is taken and it is preferred to use a combination of such steps. The exact combination of steps may be varied for different situations. It is advantageous to use at least a solvent for the polyurethane and a softening or swelling agent for the polyamide.

The application of the foregoing to a specific product can be understood by considering the practice of the invention in the construction of a hose.

In FIGURE 1 the hose of the invention is designated generally as 1. It consists generally of an inner core 2, preferably of nylon, over which has been placed a braid 3 to impart burst strength to the core. The techniques for placing the braid on the core when the core is formed of nylon are well disclosed in the aforementioned U.S. Patent No. 2,977,839.

It is preferred that the fibers of the braided cover 3 which lie adjacent to core 2 be firmly bonded to the core while the fibers of the braided cover nearer the outer surface thereof are not so bonded and are free to move with respect to each other, within the limits imposed by the structure of the braid. In this way a very strong hose is obtained without undue sacrifices of flexibility.

The tightly bonded polyurethane cover applied in accordance with the present invention is shown at 4 in FIGURE 1. As can be seen in the sectioned portion of FIGURE 1 toward the left-hand end thereof, the polyurethane coating tends to fill the interstices between the outer fibers of the braided covering 3, thus giving the hose a smoother external structure which is easy to keep clean.

FIGURE 2 shows in somewhat diagrammatic form apparatus with which the improved method of the present invention can be practiced. Partially constructed hose 10, consisting of the inner core with the braided cover over it, is held on supply reel 11. The hose is fed from the supply reel 11 through a heating means 12 which may be of any convenient construction. In FIGURE 2 it is shown as an oven provided with internally mounted infra red lamps 15. The purpose of the heating means is to pre-heat the hose, especially the outer braided covering thereof, in preparation for the softening or solvating steps which follow.

The softening or solvating equipment forms the next two sections of the apparatus shown in FIGURE 2. In order to produce a hose with a polyurethane covering over a strength-imparting braided nylon covering, it has been found desirable to use two softening or solvating materials, one which softens and swells the fibers of the braided nylon jacket or cover, and another which, when applied to the braided nylon jacket, acts as a solvent or softener to the thin polyurethane cover which is later applied. While hose useful for some purposes can be constructed without utilization of both kinds of materials, hose having the best performance properties results from the application of both kinds to the hose so that they can each act at the interface between the braided nylon cover and then later applied thin polyurethane cover.

When the invention is practiced on the apparatus of FIGURE 2, the softening agent for the braided covering, such as nylon, is applied by means of the bath 16. The hose being constructed is run through the bath at a preselected rate, chosen in view of the nature of the softening or swelling agent, the temperature, and the nature of the covering, to produce adequate softening of the outer layers of fibers in the braided coating. The hose 10 is led into the bath 16 through the conduit means 17. As can be seen in the figure, the conduit means has an orifice 31 with a flexible seal or wiper 34 placed thereagainst. The orifice 31 is posititoned at the end of the conduit 17 which can be moved into and out of the bath 16. In this way, one operating the equipment can shorten or lengthen the path of flow through the bath 16 and thus decrease or increase the residence time or detention time of the hose in the bath without changing the lineal speed of the hose. At the exit end of the bath 16 the vessel 18 is provided with an exit conduit 20 having an orifice 35 therein. The orifice is provided with a wiper member 37 which is similar to the wiper 34.

Inasmuch as the preferred softener for a braided jacket is one that is most effectively applied at an elevated temperature, there is shown in FIGURE 2 heating means 19 for the bath 16. Those skilled in the art will understand that various kinds of heating means, for example an electrical resistance element, can be employed.

It has been found that the solvent for the polyurethane can be most effectively applied by spraying it on the nylon hose which has already had the nylon softening agent applied to it.

Thus, in the apparatus of FIGURE 2 the spraying device 40 is provided. As shown in that figure it consists generally of a housing 41 having internally disposed spray headers 42 which are so oriented and positioned that the spray nozzles of the headers 42 direct a spray of solvent for polyurethane on to the hose 10 passing through the housing 41.

The hose 10 is then passed through the cross head extruder 21 which applies a coating of polyurethane of preselected thickness to it. The polyurethane coating is preferably applied shortly after the application of the spray coating of solvent for the polyurethane in order to obtain the maximum desired bonding effect resulting from the presence of a solvent for the polyurethane at the interface between the braided cover and the cover which is extruded over it.

The completed hose 1 is wound up on take-up reel 14. It has been found useful to cool the hose, as by a water quench 45, and to apply an anti-stick coating such as talc or silicone by means of dispenser 46 just before the hose is wound up on take-up reel 14. The talc or other anti-stick material is applied to prevent the sticking of one loop of hose to another by reason of tackiness of the freshly applied coating.

Although the applications of the respective solvents or swelling agents can be done in a variety of ways, such as dipping, spraying, wiping, or rolling, it should be noted that in the preferred practice of the invention the solvent or softener for the braid is applied by a dipping type operation and the solvent for the outer polyurethane cover is applied by a spraying type operation, as this combination of techniques has been found to yield the best results.

The preferred solvent or swelling agent for softening the braided nylon cover is aqueous resorcinol which provides a suitable degree of softening of the outer layers of the braided nylon jacket at practical operating temperatures and product flow rates.

The preferred solvent or swelling agent for the outer polyurethane cover is vinyl pyrrolidone. Another group of materials have been found to form satisfactory bonds, but not the superior bonds of the preferred solvent. In this group are included tetrahydrofuran, dimethyl formamide, dimethylacetamide, and methyl ethylketone. A further group of materials have been found to have some solvating effect when used in accordance with the invention, but the bonding of the outer cover obtained by the use of these materials is not, in most cases, as secure as that provided by the before-mentioned solvents. Included in this group are methyl pyrrolidone, normal pyrrolidone, butyrolactone, diols such as butane diol, and glycol ethers such as ethylene glycol dimethyl ether.

Various grades of polyurethane resin can be suitably applied as the covering coat including those sold under the trademarks Texin by Mobay, Estane by B. F. Goodrich, and Adiprene by Du Pont.

The operating conditions for the method described above can be varied over a considerable range. It is desirable that the braided surface of the hose being presented for treatment be pre-heated to at least 150° F. The range may extend up to about 200° F. The optimum operating conditions include bringing the surface of the braid to a pre-heated temperature of about 180° F. and maintaining the resorcinol bath at the same temperature. In order to optimize the strength of the bond, it is preferable to apply the hot polyurethane outer coating immediately after the solvent for that coating has been applied. It has also been found that the quality of the coating is improved if the freshly coated hose is cooled quickly by a water quench, for example, before being wound on the take-up reel.

What is claimed is:

1. A method for forming a laminated structure of polyamide and polyurethane comprising forming a polyamide substructure, softening the surface of said polyamide substructure by the application of a polyamide solvent, then applying a solvent for polyurethane to the softened surface of the polyamide substructure, and then thereafter applying hot softened polyurethane over the prepared polyamide substructure, whereby to form a laminate in which the polyurethane is tightly bonded to the polyamide.

2. A method in accordance with claim 1 and further comprising dissolving a quantity of polyurethane in said solvent for polyurethane prior to applying the solvent to the polyamide substructure.

3. A method for preparing a polyamide surface to receive a bonded polyurethane covering comprising softening the surface of said polyamide substructure, and thereafter applying to the softened surface a solvent for polyurethane having polyurethane dissolved therein.

4. A method in accordance with claim 3 in which the softening of the surface of the polyamide is accomplished by applying resorcinol to said surface.

5. A method in accordance with claim 3 in which said solvent for polyurethane is vinyl pyrrolidone.

6. A method for forming a laminate of polyamide and polyurethane in which said materials are tightly bonded to each other across their common surface comprising interposing at said surface immediately adjacent the polyamide a thin film of resorcinol, thereafter interposing at said surface immediately adjacent the polyurethane a thin film of vinyl pyrrolidone, and then pressing said polyamide and polyurethane together to bond them throughout said surface.

7. In the art of constructing flexible hose of the kind having a nylon inner core and a braided nylon cover over the core, the improvement which comprises applying a softening agent for nylon to the braided cover, thereafter applying a softening agent for polyurethane to the braided cover and thereafter applying a thin layer of polyurethane to the braided cover to form a protective coating of polyurethane thereon.

8. In the art of constructing flexible hose of the kind having a nylon inner core and a braided nylon cover over the core, the improvement which comprises softening the surface of said braided nylon cover with resorcinol, coating the softened braided nylon cover with a solvent for polyurethane and covering the braided nylon cover with a thin layer of presoftened polyurethane while said braided cover is coated with said polyurethane solvent.

9. A method for applying a protective polyurethane coating to a hose having an outer layer of braided nylon comprising softening said layer of braided nylon by preheating it and passing it through a heated bath of aqueous resorcinol, spraying said softened layer of braided nylon with a fine mist of vinyl pyrrolidone and extruding a thin coating of polyurethane over said sprayer layer of braided nylon.

10. A method in accordance with claim 9 wherein said layer of braided nylon is preheated to about 180° F. and wherein said bath of resorcinol is heated to about 180° F.

11. A method for applying a protective polyurethane coating to a hose having an outer layer of braided nylon comprising softening said layer of braided nylon by preheating it and passing it through a heated bath of nylon softening agent, spraying said softened layer of braided nylon with a fine mist of solvent for polyurethane and extruding a thin coating of polyurethane over said sprayed layer of braided nylon.

References Cited
UNITED STATES PATENTS

| | | | |
|---|---|---|---|
| 3,300,370 | 1/1967 | Epstein | 161—190 |
| 3,310,447 | 3/1967 | Matthews | 156—244 |
| 3,334,165 | 8/1967 | Koch | 156—244 |

HAROLD ANSHER, Primary Examiner

T. R. SAVOIE, Assistant Examiner

U.S. Cl. X.R.

156—308, 314; 161—190